F. W. HOCHSTETTER.
CONVERTIBLE MOVING PICTURE MACHINE.
APPLICATION FILED DEC. 4, 1913.
1,133,378.
Patented Mar. 30, 1915.
3 SHEETS—SHEET 1.
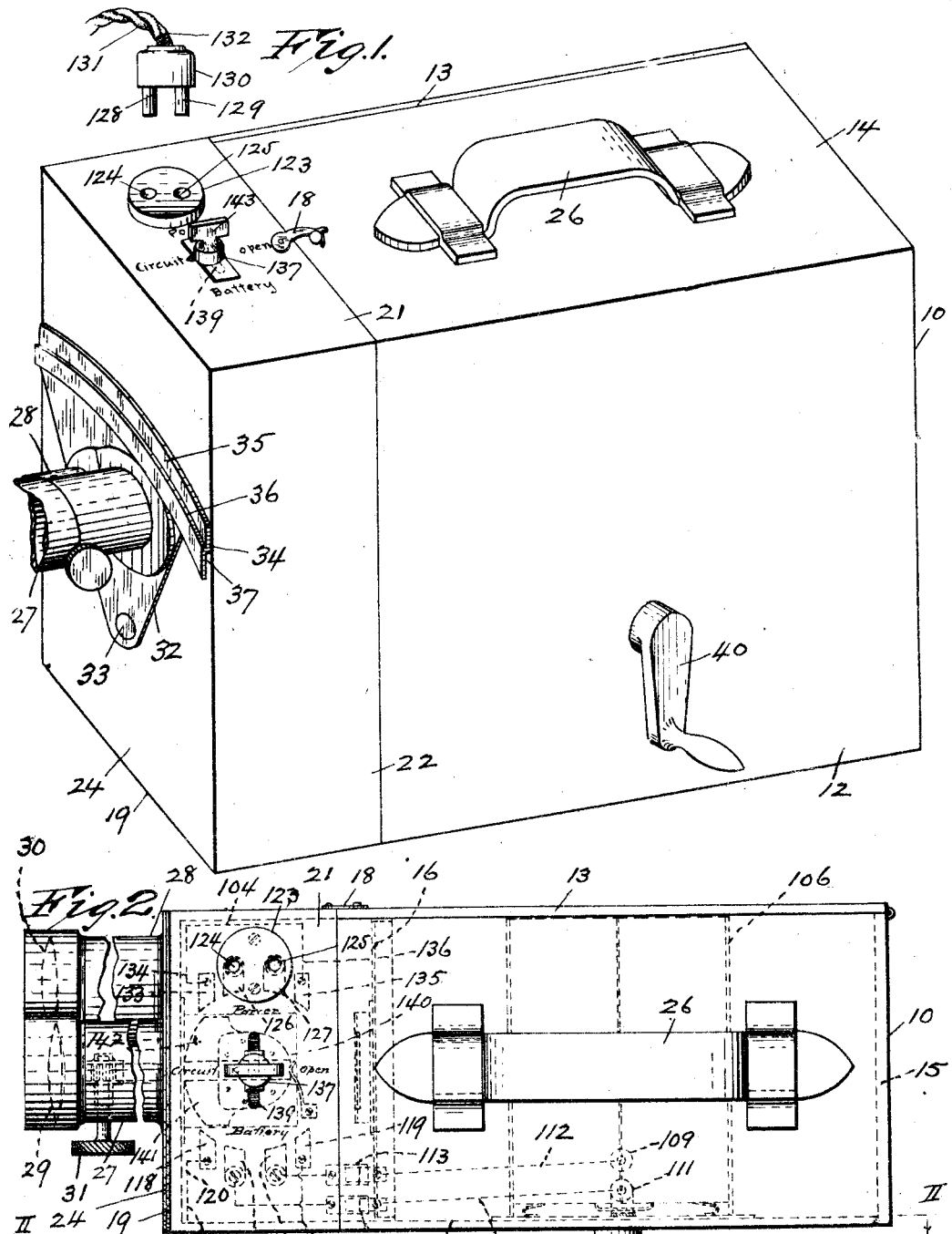

F. W. HOCHSTETTER.
CONVERTIBLE MOVING PICTURE MACHINE.
APPLICATION FILED DEC. 4, 1913.
1,133,378. Patented Mar. 30, 1915.
3 SHEETS—SHEET 2.
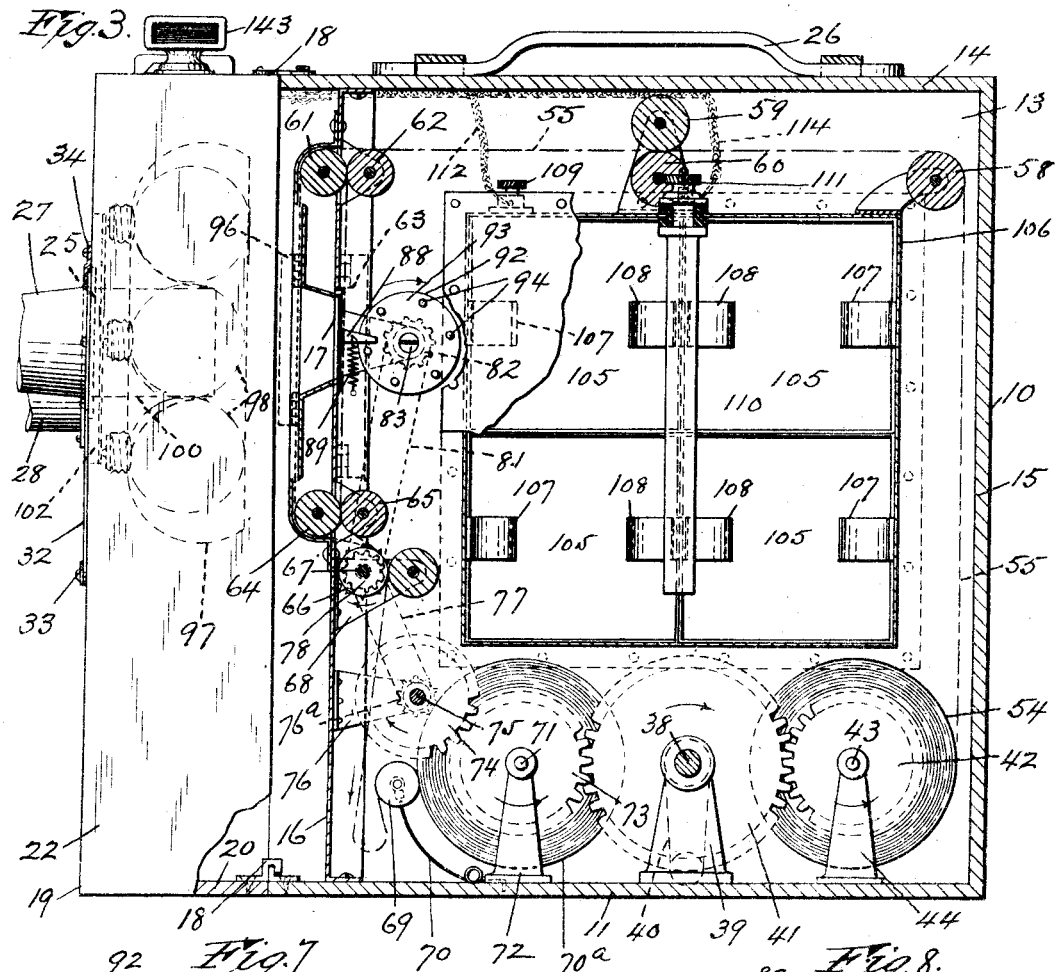
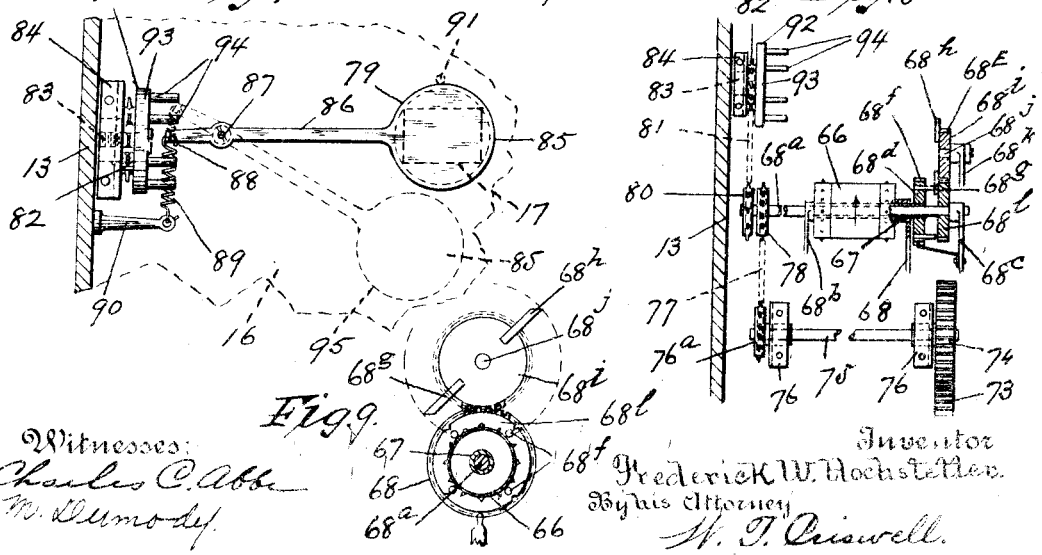

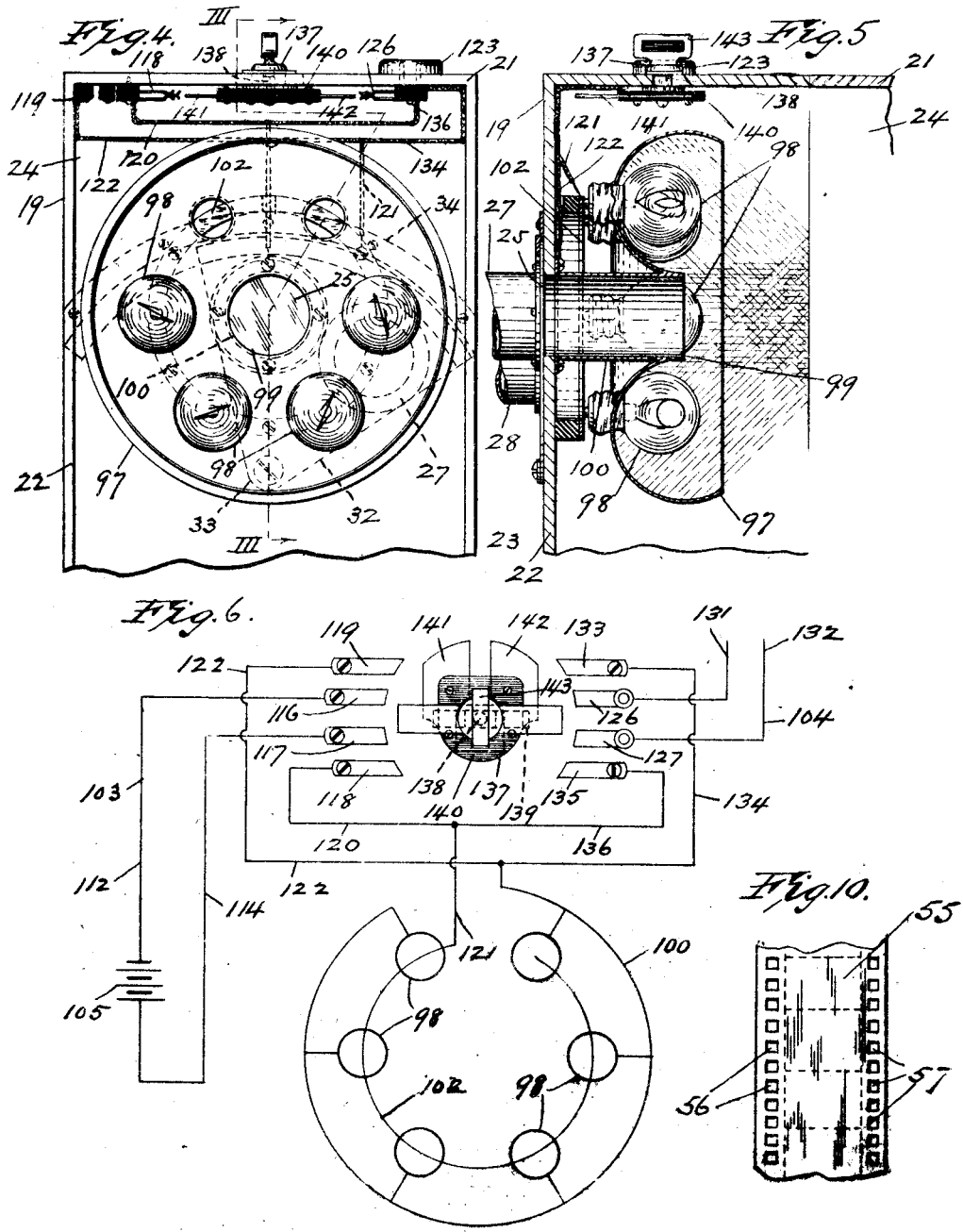

UNITED STATES PATENT OFFICE.

FREDERICK W. HOCHSTETTER, OF NEW YORK, N. Y.

CONVERTIBLE MOVING-PICTURE MACHINE.

1,133,378.   Specification of Letters Patent.   Patented Mar. 30, 1915.

Application filed December 4, 1913. Serial No. 804,667.

*To all whom it may concern:*

Be it known that I, FREDERICK W. HOCHSTETTER, a subject of the Emperor of Germany, and a resident of New York, county and State of New York, have invented a certain new and useful Improvement in Convertible Moving-Picture Machines, of which the following is a full, clear, and exact specification.

This invention relates to a class of machines adapted to be used for photographing pictures upon a strip, and subsequently employed for displaying the pictures upon a screen.

My invention has for its object primarily to provide a moving picture machine which may be converted from a camera to a projecting apparatus whereby a series of pictures of the motion acts of living objects, or scenery may be photographed in succession upon a strip and afterward consecutively display upon a screen, in order to obviate the use of two separate machines as is incident to methods usually employed in the production and exhibition of moving pictures.

Another object of the invention is to provide a machine designed to be employed especially for producing the pictures upon a strip of paper, or other opaque material which is ordinarily considered as being non-combustible, and then using the same machine for projecting these pictures.

Other objects of the invention are to provide a number of incandescent lamps adapted to be employed when the pictures of the strip are displayed upon a screen; to provide a reflector of a form which serves to deflect the rays of light from the lamps upon the pictures when being transmitted through the machine; to provide two separate electric circuits, one adapted to supply the lamps with a current from any suitable source of supply and the other being adapted to supply the lamps with a current supplied from batteries mounted in the machine, and to provide two adjustable lens barrels, one carrying a lens for photographing objects and the other carrying a lens for projecting the pictures whereby the machine may be readily converted from a camera to a projecting apparatus or vice versa.

With these and other objects in view, the invention will be hereinafter more particularly described with reference to the accompanying drawings which form a part of this specification, and will then be pointed out in the claims at the end of the description.

In the drawings, Figure 1 is a perspective view, partly fragmentary, of one form of convertible moving picture machine embodying my invention. Fig. 2 is a top plan, partly broken away, of the machine. Fig. 3 is an enlarged sectional view, partly broken away, and partly fragmentary, taken on the line II—II of Fig. 2. Fig. 4 is a view through the upper part of the extension of the casing of the machine, showing the arrangement of the lamps used for supplying light to the machine. Fig. 5 is a sectional view, partly fragmentary and partly in detail, taken on the line III—III of Fig. 4. Fig. 6 is a diagrammatic view of the electric circuits used in conjunction with the machine. Fig. 7 is an enlarged detail view, partly fragmentary and partly in section, of a form of shutter employed in the machine. Fig. 8 is an enlarged sectional view, partly in detail and partly fragmentary, of the mechanism for intermittently checking the transmission of the strip through the machine. Fig. 9 is an enlarged view looking at one end of the checking mechanism, and Fig. 10 is a fragmentary view of the form of the strip on which the pictures are produced.

The convertible moving picture machine has a casing 10 which is preferably rectangular in shape to provide a bottom 11, side walls 12 and 13, a top wall 14, and a rear wall 15. The front end of the casing 10 is open, and within the casing a slight distance from its open end is provided a vertically disposed partition 16 having an exposure window 17 therethrough. Detachably connected by means of any suitable forms of clips, as 18, to the open end of the casing 10 is an extension 19 having a bottom 20, a top wall 21, side walls 22 and 23, and a front wall 24 whereby the interior of the extension will be in communication with the open end of the casing. Through the front wall 24 of the extension is an opening 25 which is in register with the exposure window 17 of the partition 16ª of the casing, and on top of the casing 10 may be provided a handle, as 26, to permit the machine to be conveniently carried by a person.

In order to permit the machine to be conveniently used as a camera, or as a projecting apparatus, I provide two telescopic barrels, as 27 and 28, in one of which is mounted a suitable lens 29 for use when photographing the motion acts of living objects, or scenery when the machine is used as a camera, and in the other barrel is mounted a suitable lens 30 adapted to be used for displaying the pictures upon a screen when the machine is used as a projecting apparatus. The telescopic barrels may be of any desired forms so as to be adjustably lengthened or shortened in the usual manner by manipulating an adjusting screw, as 31. Both of the lens barrels 27 and 28 are held to a substantially V-shaped plate 32 the apex portion of which is pivoted, as 33, to the front wall 24 of the extension 19 so that the lens barrels may be alternately swung in register with the opening 25 of the extension for permitting light to be focused by the lenses through this opening and through the exposure window 17 of the casing 10. To permit the upper part of the plate 32 to be movably retained against the front wall of the extension, upon said front wall is provided a guide 34 which is composed of a curved plate 35 having a curved flange 36 depending from its lower edge so as to be spaced from the front wall 24 to provide a groove 37 in which the upper edge part of the swinging plate 32 is movably inserted. By providing the two lens barrels in this manner the machine may be readily employed as a projecting apparatus after being used as a camera or vice versa, thereby overcoming the necessity for providing separate lenses and applying them to the machine as would be required if only one barrel was provided.

The machine is operated by a common drive shaft 38 which is journaled in brackets 39 provided upon the bottom 11 interiorly of the casing 10, and the drive shaft is driven by the rotation of a crank handle 40 held upon one end thereof. On the drive shaft 39 is a drive gear 41 which is in mesh with a gear 42 held upon a shaft 43 journaled in brackets 44 secured upon the bottom of the casing 10, and on the shaft 43 is a delivery reel 54 which is rigidly held on the shaft so as to be rotated therewith. The delivery reel 54 is wound with a strip 55 of a formation having spaced marginal perforations, as 56 and 57 Fig. 10, similar to the usual forms of transparent moving picture films, and said strip is preferably made of paper, or other opaque material which is ordinarily considered as being non-combustible, thereby permitting the use of the usual inflammable films to be dispensed with. When the machine is used as a camera for photographing objects a sensitized form of the strip 55 is employed for producing the negatives of the pictures. From the delivery reel 54 the sensitized strip is guided over an idler 58 and between two compression rollers 59 and 60, the idler and rollers being suitably provided interiorly of the casing 10. From the compression rollers 59 and 60 the strip is directed between two compression rollers 61 and 62 rotatably held to the partition 16 above its exposure window 17, and the strip is passed through a framing device, as 63, of any well known form which is provided interiorly of the casing 10 for yieldingly holding the strip intermittently in register with the window 17 so that parts of the strip may be exposed consecutively to rays of light when producing the negatives of the pictures. The strip is then guided between two compression rollers 64 and 65 which are rotatably held to the partition 16 below the framing device 63, and the strip is passed over a sprocket drum 66 held upon a tubular shaft 67 which is journaled in the bearing of a bracket 68 provided in the casing 10. The tubular shaft 67 and the sprocket drum 66 are freely rotatable upon a shaft 68ª journaled in spaced brackets 68ᵇ and 68ᶜ provided in the casing, and on one end of said tubular shaft is held a disk 68ᵈ of a device 68ᵉ which serves to intermittently check the rotation of the sprocket drum 66 for intermittently checking the transmission of the strip 55 through the machine. Projecting from one face of the disk 68ᵈ are a number of spaced pins 68ᶠ which are in the path of movement of arms 68ᵍ and 68ʰ extending radially in opposite directions from the periphery of a gear 68ⁱ rotatable upon a stud 68ʲ held in a bracket 68ᵏ provided in the casing. The gear 68ⁱ is in mesh with a gear 68ˡ held upon the shaft 68ª so that when this shaft is revolved its rotation will be imparted to the gears 68ⁱ and 68ˡ. The arms 68ᵍ and 68ʰ will in turn be swung successively in contact with the pins 68ᶠ of the disk 68ᵈ, and the sprocket drum will thereby be intermittently revolved. From the sprocket drum 66 the strip is directed over an idler 69 rotatably held to a spring 70 for yieldingly disposing the idler toward a receiving reel 70ª upon which the strip with the negatives of the pictures photographed thereon is wound. The receiving reel 70ª is held upon a shaft 71 journaled in brackets 73 provided in the casing 10, and on this shaft is also held a gear 73 which is in mesh with the drive gear 41. Also in mesh with the gear 73 is a gear 74 held upon a shaft 75 journaled in brackets 76 extending from the partition 16 of the casing 10. On the shaft 75 is a sprocket wheel 76ª over which is guided a sprocket chain 77, and the sprocket chain is passed over a sprocket wheel 78 provided upon the shaft 68ª of sprocket drum 66. By this construction of mechanism, and when the machine is used as a camera, the sensitized strip will be intermittently transmitted from the delivery reel 54, past the window 17 for producing the negatives and will be rewound on the receiving reel 70ª when the drive shaft 38 is driven by rotating the crank handle 40.

For the purpose of intermittingly cutting-off the light during the exposures of the sensitized film, I provide a shutter, as 79, which is operated in unison with the operation of the strip transmitting mechanism, as above described, by providing on the shaft 67 a second sprocket wheel 80, and over the sprocket wheel 80 is guided a sprocket chain 81 which is directed over a sprocket wheel 82 rotatable upon a bolt 83 projecting from a bracket 84 fastened to the side wall 13 of the casing. The shutter 79 may be of any well-known type, but I prefer to employ a form of shutter composed of a disk 85, and from one part of said disk extends a bar 86. The bar 86 intermediate its ends is pivotally held, at 87, to the partition 16 of the casing, and extending at a right angle from the free end of said bar is a finger 88. To the finger 88 is attached one end of a spiral spring 89 having its other end connected to a rod 90 provided upon the side wall 13 of the casing. The spring 89 is tensioned so as to hold the finger 88 whereby the bar 86 will be disposed on a direct line transversely of the partition 10 for normally positioning the disk 85 before the exposure window 17, and to limit the upward movement of the disk, extending from the partition 16 is a stop, or pin 91 for the disk to abut against. Serving to move the finger 88 and the bar 86 against the tension of the spring 89 to intermittently swing the disk 85 from the exposure window 17, upon the bolt 83 is provided a trip 92. The trip 92 has a plate 93 held to one face of the sprocket wheel 82 so as to be rotated simultaneously therewith, and projecting from said plate are a number of spaced pins 94 which are circumferentially arranged with relation to each other. The finger 88 of the bar 86 is disposed in the path of movement of the pins 94 of the trip so that when revolved the pins thereof will consecutively contact with the finger 88 for directing it upwardly, and the bar 86 and disk 85 will in turn be swung in a downwardly direction away from the exposure window, as indicated by dotted lines at 95.

When the machine is employed for projecting the pictures of the strip 55 on a screen after the negatives are produced, as above described, have been developed, the strip is intermittently transmitted through the machine in a manner similar to its transmission therethrough when operated as a camera, excepting that the strip instead of being guided between the compression rollers 61, 62, through the framing device 63, and between the compression rollers 64, 65 is guided through an opening in the upper part of the partition 16 over the compression roller 61, then through a suitable second framing device 96 which is also provided upon the partition 16, and the strip is guided over the roller 64, over the sprocket drum 66 to the receiving reel 70ª. The machine is thereby adapted to be used for transmitting the strip for displaying the pictures thereon with equal facility to its employment as a camera, and in order to provide efficient lighting means for projecting the pictures of the opaque strip 55 upon a screen, I provide a reflector 97, and a number of electric lamps, as 98.

The reflector 97 is of an annular cup-shaped formation having an opening 99 centrally therethrough in which is mounted one end of a metal tube 100. The other end of the tube 100 is secured to the inner surface of the front wall 24 of the extension 19 of the casing 10 so that the passage through the tube is in register with the opening 25 of said extension and also in register with the openings through the framing device 93 and with the exposure window 17 of the partition 16. At spaced intervals concentrically through the reflector 97 are a number of threaded openings, in each of which is screwed the socket of one of the electric lamps so that all of the lamps are in opposed relation to the pictures of the strip when intermittently exposed through the opening of the framing device 96, and said reflector is disposed to adapt it to deflect the rays of light from the lamps upon the pictures of the opaque strip. In this manner the pictures of the strip will be projected through the passage of the tube 100, through the opening 25 of the extension, and through one of the lens barrels 27 and 28.

The electric lamps 98 may be of the usual, or any preferred types, and the sockets of said lamps extend through the threaded openings of the reflector 97 so that the contacts thereof are imposed against an annular metal plate 102 provided upon the front wall of the extension 19 of the casing. The lamps 98 may be lighted by currents supplied thereto over separate electric circuits, as 103 and 104. The electric circuit 103 consists in providing one, or a plurality of dry-cell batteries 105 of any suitable makes which are carried in an inner housing 106 arranged in the casing 10 of the machine. The housing 106 is formed of metal, and each of the batteries 105 is provided with two poles, as 107 and 108. The poles 107 of the batteries are disposed in contact with the metal housing 106, and on said housing is provided a binding post 109. In contact with the poles 108 of the batteries is a metal strip 110 provided with a binding post 111 which is insulated from the metal housing. To the binding post 109 is connected one end of a wire 112 which terminates adjacent to the front end of the casing 10 with one contact member of a knife switch 113, and to the binding post 111 is connected one end of a wire 114 which also terminates adjacent to the front end of said casing with one contact member of a knife switch 115. The knife switches 113 and 115 are of the ordinary types composed of two interfitting contact members, and said switches are interposed in the wires for permitting make and brake contacts to be made in the circuit 103 so that the extension 19 may be detached from the casing 10. A branch of the wire 112 extends into the extension 19, and on the end of this branch of the wire which is opposed to the first contact member of the knife switch 113 is provided the second contact member of said switch. The opposite end of this branch of the wire 112 terminates with a contact 116. A branch of the wire 114 likewise extends into the extension 19, and on the end of this branch of the wire which is opposed to the first contact member of the knife switch 115 is provided the second contact member of said switch. The opposite end of this branch of the wire 114 terminates with a contact 117. In the electric circuit 103 are also provided two contacts 118 and 119. Connected to the contact 118 is one end of a wire 120 leading in a wire 121 connected to the metal plate 102 against which is imposed the sockets of the lamps 98, and to the contact 119 is connected one end of a wire 122 leading to the metal tube 100 of the reflector 97. The contacts 116, 117, 118, 119 are relatively positioned in spaced parallel arrangement so that their free ends are disposed on the curvature of a circle.

The circuit 104 is designated to supply current to the lamps 98 from any suitable source of supply, in order to allow the batteries 105 to be dispensed with as occasion requires. The circuit 104 consists in providing a metal socket 123 on the top 21 of the extension 19 of the casing 10, and this socket has two spaced metal tubular posts 124 and 125 extending through openings in the top of the extension. Connected to the post 124 interiorly of the extension is one end of a contact 126, and connected to the post 125 also interiorly of said extension is another contact 127. The tubular posts 124 and 125 are adapted to receive, respectively, the contacts 128 and 129 of a removable plug 130 connected on one end of each of two wires 131 and 132 leading from any source of electricity supply other than the batteries 105. Also interiorly of the extension 19 is a third contact 133 one end of which is connected to a wire 134 leading to the metal tube 100 of the reflector 97. A fourth contact 135 is provided in said extension, and from one end of this contact leads a wire 136 to the wire 121 and the plate 102 of the lamps. The contacts 126, 127, 133, 135 are relatively positioned in spaced parallel arrangement so that their free ends are disposed on the curvature of a circle, and the free ends of these contacts are in spaced opposed relation to the free ends of the contacts 116, 117, 118, 119, respectively, as shown.

Serving to permit the electric circuits 103 or 104 to be separately closed, I provide a switch, as 137. The switch 137 has a post 138 which is rotatably as well as slidably disposed through an elongated slot 139 provided in the top 21 of the extension 19 of the casing 10 midway between the contacts 116, 117, 118, 119 and contacts 126, 127, 133, 135 of the electric circuits. On the lower end of the post 138 interiorly of the extension 19 is held an insulating plate 140, and mounted on this plate are two contacts 141 and 142 which are in the forms of metal blades projecting in similar directions from the insulating plate, and both of these contacts have the free ends thereof curved to conform with the curvature of the ends of each set of the contacts 116, 117, 118, 119 and 126, 127, 133, 135. On the upper end of the post 138 of the switch and above the top of the extension 19 is provided a handle 143 for permitting the switch 137 to be manually operated.

When it is desired to light the lamps 98 by a current supplied over the circuit 103 from the batteries 105, the switch 137 is swung so that the curved ends of the contacts 141 and 142 thereof are disposed in opposition to the curved ends of the contacts 116, 117, 118, 119 of said circuits, and the switch is then slidably moved in the elongated slot 139 for its contacts to abut against the said contacts of this circuit. The circuit will then be closed from one of the corresponding poles of each of the batteries so that the current will be transmitted over the wire 112 to the contact 116, through the contact 142 of the switch, through contact 119, over wire 122, through the metal tube 100 of the reflector, through the lamps 98, through the plate 102, over the wires 121 and 120, through the contacts 118, through the contact 141 of the switch, through the contact 130

117, and over the wire 114 to the corresponding second pole of each of the batteries. When it is desired to light the lamps by a current supplied over the circuit 104 from a suitable source of supply other than the batteries 105 the plug 130 is inserted in the socket 123. The switch 137 is then swung so that the curved ends of the contacts 141 and 143 thereof are disposed in opposed relation to the curved ends of the contacts 126, 127, 133, 135, and the switch is slidably shifted in the elongated slot 139 for its contacts to abut against the said contacts of this circuit. The circuit will then be closed from the source of supply over the wire 131, through contact 126, through contact 141 of the switch, through contact 133, over wire 134, through the tube 100 of the reflector, through the lamps 98, through the plate 102, over wires 121 and 136, through contact 127, to contact 142 of the switch, to contact 127, and over the wire 132 leading from the source of supply. In this manner either of the electric circuits 103 and 104 may be separately employed for lighting the lamps 98 when the machine is used as a projecting apparatus for displaying the pictures of the strip upon a screen. Thus a simple and efficient machine may be produced which is easily convertible from a camera to a projecting apparatus whereby animated pictures of objects may be photographed in succession on a strip and afterward displayed on a screen without the use of two separate machines as is incident to the methods usually employed in the production and exhibition of moving pictures.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a convertible moving picture machine, in combination, a casing having an exposure window, a pair of lens barrels provided on the casing, one of the barrels carrying a photographic lens, and the other carrying a projecting lens, said barrels being adjustable for alternately focusing light through the exposure window, a drive shaft, mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, a plurality of lamps mounted in the casing, means for lighting the lamps, and a reflector also mounted in the casing, said reflector serving to deflect the rays of light from the lamps upon the pictures of the strip whereby the pictures will be displayed upon a screen.

2. In a convertible moving picture machine, in combination, a casing having an exposure window, a pair of lens barrels provided on the casing, one of the barrels carrying a photographic lens, and the other carrying a projecting lens, said barrels being adjustable for alternately focusing light through the exposure window, a drive shaft, mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, a plurality of incandescent lamps mounted in the casing, an electric circuit, means provided in the circuit for closing the circuit to light the lamps, and a reflector also mounted in the casing, said reflector serving to deflect the rays of light from the lamps upon the pictures of the strip whereby the pictures will be displayed upon a screen.

3. In a convertible moving picture machine, in combination, a casing having an exposure window, a pair of lens barrels provided on the casing, one of the barrels carrying a photographic lens, and the other carrying a projecting lens, said barrels being adjustable for alternately focusing light through the exposure window, a drive shaft, mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, a plurality of incandescent lamps mounted in the casing, an electric circuit arranged within the casing, a battery provided in the circuit, a switch provided in the casing for closing the circuit to light the lamps, and a reflector also mounted in the casing, said reflector serving to deflect the rays of light from the lamps upon the pictures of the strip whereby the pictures will be displayed upon a screen.

4. In a convertible moving picture machine, in combination, a casing having an exposure window, a pair of lens barrels provided on the casing, one of the barrels carrying a photographic lens, and the other carrying a projecting lens, said barrels being adjustable for alternately focusing light through the exposure window, a drive shaft, mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, a plurality of incandescent lamps mounted in the casing, two electric circuits arranged within the casing, means for supplying current separately to each circuit, a switch for alternately closing the circuits to separately light the lamps, and a reflector mounted in the casing, said reflector serving to deflect the rays of light from the lamps upon the pictures of the strip whereby the pictures will be displayed upon a screen.

5. In a convertible moving picture machine, in combination, a casing having an exposure window, a pair of lens barrels provided on the casing, one of the barrels carrying a photographic lens, and the other carrying a projecting lens, said barrels being adjustable for alternately focusing light through the exposure window, a drive shaft, mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, a plurality of incandescent lamps mounted in the casing, two electric circuits arranged within the casing, one leading from a suitable source of supply, batteries carried in the casing for supplying current to the second electric circuit, a switch for alternately closing the circuits to separately light the lamps, and a reflector also mounted in the casing, said reflector serving to deflect the rays of light from the lamps upon the pictures of the strip whereby the pictures will be displayed upon a screen.

6. In a convertible moving picture machine, the combination with a casing having an exposure window, a pair of lens barrels provided on the casing, one of the barrels carrying a photographic lens, and the other carrying a projecting lens, said barrels being adjustable for alternately focusing light through the exposure window, a drive shaft, and mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, of a plurality of lamps mounted in the casing, means for lighting the lamps, and a reflector also mounted in the casing, said reflector serving to deflect the rays of light from the lamps upon the pictures of the strip whereby the pictures will be displayed upon a screen.

7. In a convertible moving picture machine, the combination with a casing having an exposure window, a pair of lens barrels provided on the casing, one of the barrels carrying a photographic lens, and the other carrying a projecting lens, said barrels being adjustable for alternately focusing light through the exposure window, a drive shaft, and mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, of a plurality of lamps mounted in the casing, an electric circuit, means provided in the circuit for closing the circuit to light the lamps, and a reflector also mounted in the casing, said reflector serving to deflect the rays of light from the lamps upon the pictures of the strip whereby the pictures will be displayed upon a screen.

8. In a convertible moving picture machine, the combination with a casing having an exposure window, a pair of lens barrels provided on the casing, one of the barrels carrying a photographic lens, and the other carrying a projecting lens, said barrels being adjustable for alternately focusing light through the exposure window, a drive shaft, and mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, of a plurality of incandescent lamps mounted in the casing, an electric circuit arranged with the casing, a battery within the casing for supplying current to the circuit, a switch provided in the casing for closing the circuit to light the lamps, and a reflector also mounted in the casing, said reflector serving to deflect the rays of light from the lamps upon the pictures of the strips whereby the pictures will be displayed upon a screen.

9. In a convertible moving picture machine, the combination with a casing having an exposure window, a pair of lens barrels provided on the casing, one of the barrels carrying a photographic lens; and the other carrying a projecting lens, said barrels being adjustable for alternately focusing light through the exposure window, a drive shaft, and mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, of a plurality of incandescent lamps mounted in the casing, two electric circuits arranged within the casing, means for supplying current separately to each circuit, a switch for alternately closing the circuits for separately lighting the lamps, and a reflector mounted in the casing, said reflector serving to deflect the rays of light from the lamps upon the pictures of the strip whereby the pictures will be displayed upon a screen.

10. In a convertible moving picture machine, the combination with a casing having an exposure window, a pair of lens barrels provided on the casing, one of the barrels carrying a photographic lens, and the other carrying a projecting lens, said barrels being adjustable for alternately focusing light through the exposure window, a drive shaft, and mechanism within the casing, and operated by the drive shaft for intermittently transmitting a sensitized strip before the window so as to be exposed to rays of light focused from the photographic lens for photographing pictures thereon, said mechanism being also adapted to intermittently transmit the strip subsequently through the machine and past the projecting lens, of a plurality of incandescent lamps mounted in the casing, two electric circuits arranged within the casing, one leading from a suitable source of supply, batteries carried in the casing for supplying current to the second electric circuit, a switch provided on the casing for alternately closing the circuits to separately light the lamps, and a reflector also mounted in the casing, said reflector serving to deflect the rays of light from the lamps upon the pictures of the strip whereby the pictures will be displayed upon a screen.

11. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a pair of lens barrels provided upon the casing, one of the barrels carrying a photographic lens, and the other carrying a projecting lens, said barrels being adjustable for alternately focusing light through the exposure window upon the strip, a plurality of lamps mounted in the casing, means for lighting the lamps, and a reflector also mounted in the casing, said reflector serving to deflect the rays of light from the lamps upon the pictures of the strip whereby the pictures will be displayed upon a screen.

12. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a pair of lens barrels provided upon the casing, one of the barrels carrying a photographic lens, and the other carrying a projecting lens, said barrels being adjustable for alternately focusing light through the exposure window upon the strip, a plurality of incandescent lamps mounted in the casing, an electric circuit, means provided in the circuit for closing the circuit to light the lamps, and a reflector also mounted in the casing, said reflector serving to deflect the rays of light from the lamps upon the pictures of the strip whereby the pictures will be displayed upon a screen.

13. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a pair of lens barrels provided upon the casing, one of the barrels carrying a photographic lens and the other carrying a projecting lens, said barrels being adjustable for alternately focusing light through the exposure window upon the strip, a plurality of incandescent lamps mounted in the casing, an electric circuit arranged in the casing, a battery within the casing for supplying current to the circuit, a switch on the casing for closing the circuit to light the lamps, and a reflector also mounted in the casing, said reflector serving to deflect the rays of light from the lamps upon the pictures of the strip whereby the pictures will be displayed upon a screen.

14. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a pair of lens barrels provided upon the casing, one of the barrels carrying a photographic lens, and the other carrying a projecting lens, said barrels being adjustable for alternately focusing light through the exposure window upon the strip, a plurality of incandescent lamps mounted in the casing, two electric circuits arranged within the casing, one leading from a suitable source of supply, batteries carried in the casing for supplying current to the second electric circuits, a switch for alternately closing the circuits to separately light the lamps, and a reflector also mounted in the casing, said reflector serving to deflect the rays of light from the lamps upon the pictures of the strip whereby the pictures will be displayed upon a screen.

15. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a removable extension provided upon the casing, said extension having an opening in register with the window of the casing, a pair of lens barrels provided upon the extension, one of the barrels carrying a photographic lens, and the other carrying a projecting lens, said barrels being adjustable for alternately focusing light through the opening of the extension upon the strip, a plurality of lamps mounted in the extension, means for lighting the lamps, and a reflector also mounted in the extension, said reflector serving to deflect the rays of light from the lamps upon the pictures of the strip whereby the pictures will be displayed upon a screen.

16. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a removable extension provided upon the casing, said extension having an opening in register with the window of the casing, a pair of lens barrels provided upon the extension, one of the barrels carrying a photographic lens, and the other carrying a projecting lens, said barrels being adjustable for alternately focusing light through the opening of the extension upon the strip, a plurality of incandescent lamps mounted in the extension, an electric circuit, means provided on the extension for closing the circuit to light the lamps, and a reflector also mounted in the extension, said reflector serving to deflect the rays of light from the lamps upon the pictures of the strip whereby the picture will be displayed upon a screen.

17. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a removable extension provided upon the casing, said extension having an opening in register with the window of the casing, a pair of lens barrels provided upon the extension, one of the barrels carrying a photographic lens, and the other carrying a projecting lens, said barrels being adjustable for alternately focusing light through the opening of the extension upon the strip, a plurality of incandescent lamps mounted in the extension, an electric circuit arranged in the extension, a battery in the casing, electrical means for detachably connecting the circuit to the battery, a switch arranged on the extension for closing the circuit to light the lamps, and a reflector mounted in the extension, said reflector serving to deflect the rays of light from the lamps upon the pictures of the strip whereby the pictures will be displayed upon a screen.

18. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a removable extension provided upon the casing, said extension having an opening in register with the window of the casing, a pair of lens barrels provided upon the extension, one of the barrels carrying a photographic lens, and the other carrying a projecting lens, said barrels being adjustable for alternately focusing light through the opening of the extension upon the strip, a plurality of incandescent lamps mounted in the extension, two electric circuits arranged within the extension, a switch for alternately closing the circuits to separately light the lamps, and a reflector also mounted in the extension, said reflector serving to deflect the rays of light from the lamps upon the pictures of the strip whereby the pictures will be displayed upon a screen.

19. In a convertible moving picture machine, the combination with a casing having an exposure window, a drive shaft, and mechanism within the casing, and operated by the drive shaft for intermittently transmitting a sensitized strip before the window so as to be exposed to rays of light for photographing pictures thereon, said mechanism being also adapted to subsequently transmit the strip and its pictures through the machine for projecting the pictures, of a removable extension provided upon the casing, said extension having an opening in register with the window of the casing, a pair of lens barrels provided upon the extension, one of the barrels carrying a photographic lens, and the other carrying a projecting lens, said barrels being adjustable for alternately focusing light through the opening of the extension upon the strip, a plurality of incandescent lamps mounted in the extension, means for lighting the lamps, two electric circuits arranged within the extension, one leading from a suitable source of supply, batteries carried in the casing for supplying current to the second electric circuit, means detachably connecting the batteries to the second circuit, a switch for alternately closing the circuits to separately light the lamps, and a reflector also mounted in the extension, said reflector serving to deflect the rays of light from the lamps upon the pictures of the strip whereby the pictures will be displayed upon a screen.

20. In a convertible moving picture machine, the combination with a casing having an exposure window, a removable extension provided upon the casing, said extension having an opening in register with the window of the casing, and a pair of lens barrels provided upon the extension, one of the barrels carrying a photographic lens, and the other carrying a projecting lens, said barrels being adjustable for alternately focusing light through the opening of the extension, of a plurality of lamps mounted in the extension, means for lighting the lamps, a drive shaft rotatable in the casing, mechanism within the casing, and operated by the drive shaft for intermittently transmitting a sensitized strip before the window of the casing so as to be exposed to rays of light for photographing pictures thereon, said mechanism being also adapted to subsequently transmit the strip and its pictures intermittently through the machine and past the projecting lens, and a reflector also mounted in the extension, said reflector serving to deflect the rays of light from the lamps upon the pictures of the strip whereby the pictures will be displayed upon a screen.

21. In a convertible moving picture machine, the combination with a casing having an exposure window, a removable extension provided upon the casing, said extension having an opening in register with the window of the casing, and a pair of lens barrels provided upon the extension, one of the barrels carrying a photographic lens, and the other carrying a projecting lens, said barrels being adjustable for alternately focusing light through the opening of the extension, of a plurality of incandescent lamps mounted in the extension, an electric circuit arranged in the extension, means provided on the extension for closing the circuit to light the lamps, a drive shaft rotatable in the casing, mechanism within the casing, and operated by the drive shaft for intermittently transmitting a sensitized strip before the window of the casing so as to be exposed to rays of light focused from the photographic lens for photographing pictures thereon, said mechanism being also adapted to subsequently transmit the strip and its pictures intermittently through the machine and past the projecting lens, and a reflector also mounted in the extension, said reflector serving to deflect the rays of light from the lamps upon the pictures of the strip whereby the pictures will be displayed upon a screen.

22. In a convertible moving picture machine, the combination with a casing having an exposure window, a removable extension provided upon the casing, said extension having an opening in register with the window of the casing, and a pair of lens barrels provided upon the extension, one of the barrels carrying a photographic lens, and the other carrying a projecting lens, said barrels being adjustable for alternately focusing light through the opening of the extension upon the strip, of a plurality of incandescent lamps mounted in the extension, two electric circuits arranged within the extension, one leading from a suitable source of supply, batteries carried in the casing, means in the casing for detachably connecting the batteries to the second circuit, a switch for alternately closing the circuits to separately light the lamps, a drive shaft rotatable in the casing, mechanism within the casing, and operated by the drive shaft for intermittently transmitting a sensitized strip before the window of the casing so as to be exposed to rays of light focused from the photographic lens for photographing pictures thereon, said mechanism being also adapted to subsequently transmit the strip and its pictures intermittently through the machine and past the projecting lens, and a reflector also mounted in the extension, said reflector serving to deflect the rays of light from the lamps upon the pictures of the strip whereby the pictures will be displayed upon a screen.

This specification signed and witnessed this third day of December A. D. 1913.

FREDERICK W. HOCHSTETTER.

Witnesses:
ROBT. B. ABBOTT,
M. DERMODY.